March 13, 1962    E. JÖNSSON    3,025,455
TEMPERATURE COMPENSATED BATTERY CIRCUIT
Filed Nov. 4, 1957
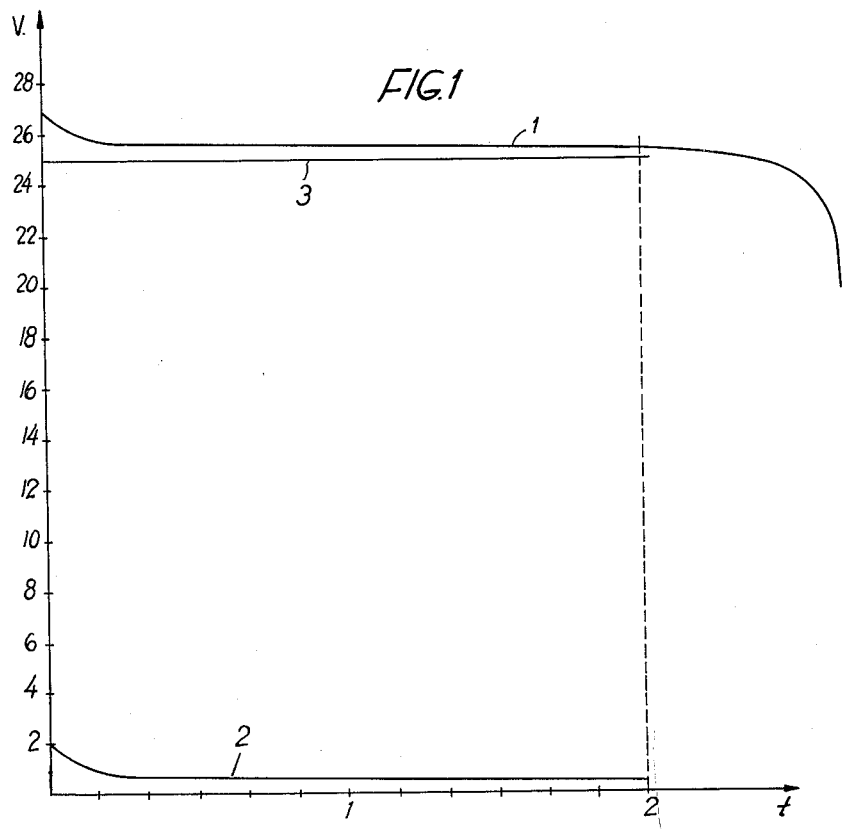
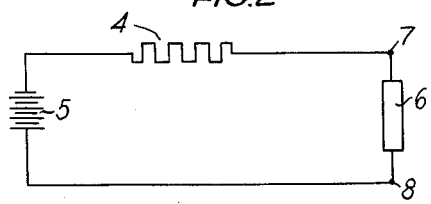
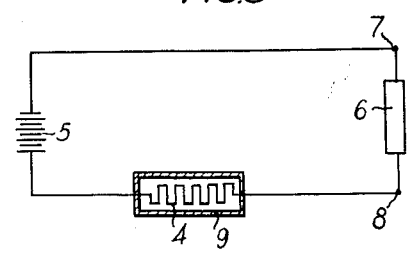
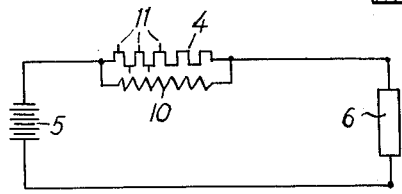
INVENTOR.
Erik Jönsson
BY
Pierce, Scheffler & Parker
Attorneys

United States Patent Office 3,025,455
Patented Mar. 13, 1962

3,025,455
TEMPERATURE COMPENSATED BATTERY
CIRCUIT
Erik Jonsson, Fallebo, Oskarshamn, Sweden, assignor to
Svenska Ackumulator Aktiebolaget Jungner, Stockholm, Sweden, a corporation of Sweden
Filed Nov. 4, 1957, Ser. No. 694,440
Claims priority, application Sweden Nov. 28, 1956
6 Claims. (Cl. 323—68)

In electric storage batteries and primary batteries it is desirable to obtain a voltage as constant as possible during discharge of the battery. For certain purposes, the requirements in this respect are extremely rigorous. In modern technics, the tendency is towards increased discharge currents such that the major part of the capacity of a battery should be able to be utilized during a short period of time, such as a few minutes. In order to fulfill these requirements it has become necessary to use thinner and an increased number of electrode plates to increase the total active surface of the electrodes for a given capacity. At the same time efforts have to be made even otherwise to maintain the internal resistance of the battery at a value as low as possible.

However, it can not be avoided that the batteries, provided that they are given economically reasonable dimensions, will produce a higher voltage at the beginning of the discharge than later on if the discharge current is maintained constant. This may be a serious problem if the desired voltage limits are very narrow.

In accordance with this invention, this problem is solved in a simple and inexpensive manner by the provision of a resistor having a negative temperature coefficient, said resistor being coupled to the load circuit and being of such a nature that during discharge of the battery it will be traversed by at least part of the load current so as to compensate for the voltage drop occuring at the beginning of the discharge across the terminals of the battery, whereby to maintain constant the voltage across the load circuit during the discharge. Said resistor is on the market and termed, i.a., NTC resistor, and usually consists of a sintered mass of metallic oxides and is, consequently, of the semi-conductor type. In resistors of this type, the resistance value becomes lower at increasing temperature. Consequently, when the battery is coupled to the load, the resistor is cold and has a comparatively high resistance value, but as it becomes heated by the current flowing therethrough, the resistance value and the voltage drop across the resistor will become lower.

It will be apparent that this change may be used to compensate, to a certain degree, for the excessive voltage of a battery at the beginning of its discharge.

The resistor may be connected in series with the battery and the load, but the object of the invension may be attained as well if the resistor is shunted across the load. Various combinations of resistors having different temperature coefficients are conceivable. Also, a resistor having a positive temperature coefficient may be combined with the resistor having a negative temperature coefficient. In this way, the arrangement may be adapted to batteries having different discharge curves. Further, the properties of the resistors may be varied by various measures, in order to increase or decrease the velocity at which the temperature of the resistor is changed when current begins to flow therethrough.

The invention is described more closely with reference to the annexed drawings which diagrammatically illustrate several embodiments. FIG. 1 illustrates a discharge diagram explaining the principle of the invention. FIGS. 2, 3 and 4 show three different circuit diagrams of the arrangement according to the invention.

In FIG. 1, numeral 1 denotes the discharge curve of a battery at a certain current load or, in other words, the battery voltage $v$ has a function of the discharge time $t$. The maximum discharge time is assumed to be about two minutes. The voltage drop across a resistor coupled to the battery circuit and having a negative temperature coefficient varies in accordance with curve 2. In the exemplified case, a constant voltage of 25 volt is desired across the load coupled to the circuit during a period of two minutes, this being attained due to the resistor. If the voltage values according to curve 2 are subtracted from the corresponding voltage values according to curve 1 in the diagram, curve 3 is obtained which is a straight horizontal line representing a constant voltage. In other words, the variable voltage drop across the resistor 4 for a constant current flowing to the load is matched to the initial voltage drop at the terminals of the storage battery 5 so that the voltage applied to the load itself will remain constant.

FIG. 2 illustrates an example of the arrangement of a resistor 4 having a negative temperature coefficient in series with the battery 5 and a load 6. Across the resistor 4 there occurs the voltage drop represented by curve 2 in FIG. 1, whereas the constant voltage represented by curve 3 prevails across the terminals 7, 8 of the load.

If desired, the resistor may be devised such as to obtain an increasing rather than a constant voltage during the course of discharge.

Different batteries may have discharge curves which are highly different from each other. For instance, the duration and magnitude of the excessive voltage at the beginning of the discharge may vary to a large extent. For this reason it may be desirable to delay or speed up the change in the resistance value or, in other words, to construct the resistor such as to have a higher or lower thermal inertia. In FIG. 3, the resistor 4 is assumed to be housed in a container 9 filled with a liquid, such as water or oil, which at the beginning of the discharge absorbs the heat generated by the resistor, the result being that the temperature of the resistor will be increased at a lower rate than otherwise. Consequently, the resistance value will not rapidly become lower at increasing temperature, but will be lowered more slowly than in a resistor without heat accumulator. Instead of a liquid, a metal may be used as a heat accumulating means.

A modified, for instance diminished, effect of the resistor having a negative temperature coefficient may be obtained by combining this resistor with one or more other resistor members of a similar type or with ordinary resistors. An example of the last named case is illustrated in FIG. 4 in which the battery circuit in addition to the load 6 and the resistor 4 connected in series with the load comprises a resistor 10 of ordinary type having a positive temperature coefficient. While the resistor 10 is illustrated as being connected in parallel with the resistor 4, it may instead thereof be connected in series therewith.

In certain cases it may be suitable to provide the resistor 4 with cooling fins or to take other measures to increase the emission of heat from the resistor to the ambient atmosphere, in order to have the temperature of the resistor increase comparatively slowly at the beginning of the discharge. As a result, the resistance value of the resistor will not vary to such a high degree as otherwise. An example thereof is shown in FIG. 4 in which cooling fins are denoted at 11.

It will be obvious that heat accumulating means and/or cooling fins may be provided in all embodiments of the invention irrespective of the way in which the resistor is connected in the battery circuit.

The arrangement described has the advantage of requiring a very small space, especially due to the fact that the resistor may be housed in the battery.

What I claim is:

1. An electric circuit comprising an electric storage battery, a load, circuit means connecting said battery with said load, said load being such as will effect a discharge of a major part of the capacity of said battery at constant current within a short period of time and said battery being characterized by an appreciable drop in terminal voltage with time at the beginning of said discharge period, and means for compensating for the variation in battery voltage, said compensating means comprising a resistor having a negative temperature coefficient connected in said circuit means in series between said battery and load, the variation in resistance of said resistor with time as a function of its corresponding change in temperature being matched to the characteristic voltage drop of said battery thereby to maintain a constant voltage across said load throughout said discharge period.

2. A circuit as claimed in claim 1 and further characterized by the fact that the resistor is provided with means increasing the emission of heat from the resistor.

3. A circuit as claimed in claim 1 and further comprising a second resistor having a temperature coefficient different from that of the first mentioned resistor.

4. A circuit as claimed in claim 1 and further characterized by the fact that the resistor is housed in the battery.

5. A circuit as claimed in claim 1 and further comprising a heat-accumulating member thermally connected with the resistor, said member having a substantial heat capacity to give the resistor an inertia.

6. A circuit as claimed in claim 1 and further comprising a resistor having a positive temperature coefficient, the two resistors being designed to yield, together, a variable resistance to compensate for the initial voltage drop of the battery.

References Cited in the file of this patent

UNITED STATES PATENTS

| | | |
|---|---|---|
| 991,105 | Turbayne | May 2, 1911 |
| 1,788,970 | Andre et al. | Jan. 13, 1931 |
| 2,014,533 | Logan | Sept. 17, 1935 |
| 2,032,455 | Williams | Mar. 3, 1936 |
| 2,050,703 | Johnson | Aug. 11, 1936 |
| 2,332,073 | Grierson | Oct. 19, 1943 |
| 2,366,992 | Welling et al. | Jan. 9, 1945 |
| 2,421,523 | Rady | June 3, 1947 |
| 2,422,925 | Rady et al. | June 24, 1947 |
| 2,747,158 | Le Bel | May 22, 1956 |

FOREIGN PATENTS

| | | |
|---|---|---|
| 769,910 | France | Sept. 4, 1934 |